United States Patent
Guo et al.

(10) Patent No.: US 8,879,440 B2
(45) Date of Patent: Nov. 4, 2014

(54) METHOD AND APPARATUS FOR AD HOC VENUE-CAST SERVICE

(75) Inventors: Jiming Guo, Beijing (CN); William Y. Huang, Beijing (CN); Michael M. Fan, Beijin (CN); Xiaoyi Zhu, Beijing (CN); Matthew S. Grob, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 873 days.

(21) Appl. No.: 12/569,734

(22) Filed: Sep. 29, 2009

(65) Prior Publication Data
US 2011/0075612 A1 Mar. 31, 2011

(51) Int. Cl.
| H04B 7/00 | (2006.01) |
| H04L 29/08 | (2006.01) |
| H04L 12/18 | (2006.01) |
| H04W 4/06 | (2009.01) |
| H04H 60/80 | (2008.01) |
| H04W 68/00 | (2009.01) |

(52) U.S. Cl.
CPC .............. *H04L 12/189* (2013.01); *H04L 67/26* (2013.01); *H04W 4/06* (2013.01); *H04H 60/80* (2013.01); *H04W 68/00* (2013.01)
USPC ......................................................... 370/310

(58) Field of Classification Search
None
See application file for complete search history.

(56) References Cited

U.S. PATENT DOCUMENTS

| 6,578,203 | B1 | 6/2003 | Anderson, Jr. et al. |
| 7,124,425 | B1 | 10/2006 | Anderson, Jr. et al. |
| 7,149,549 | B1 | 12/2006 | Ortiz et al. |
| 7,376,388 | B2 | 5/2008 | Ortiz et al. |
| 7,715,855 | B2 | 5/2010 | Subrahmanya |
| 2003/0007464 | A1* | 1/2003 | Balani ........................... 370/310 |
| 2007/0070962 | A1 | 3/2007 | Kilburn et al. |
| 2007/0161402 | A1* | 7/2007 | Ng et al. .................... 455/554.2 |
| 2007/0204294 | A1 | 8/2007 | Walker et al. |
| 2007/0286106 | A1* | 12/2007 | Yang et al. .................... 370/312 |

FOREIGN PATENT DOCUMENTS

| EP | 1 379 048 A1 | 1/2004 | |
| IT | EP1379048 | * 7/2004 | ............. H04L 29/06 |
| JP | 2002123640 A | 4/2002 | |
| JP | 2004242257 A | 8/2004 | |
| JP | 2007518371 A | 7/2007 | |
| JP | 2008172635 A | 7/2008 | |
| WO | 2005072001 A2 | 8/2005 | |

OTHER PUBLICATIONS

International Search Report and Written Opinion—PCT/US2010/050586, International Search Authority—European Patent Office—Dec. 8, 2010.
http://placesite.com/.
European Search Report—EP12162783—Search Authority—Hague—Feb. 22, 2013.

* cited by examiner

*Primary Examiner* — Derrick Ferris
*Assistant Examiner* — Kodzovi Acolatse
(74) *Attorney, Agent, or Firm* — Fulbright & Jaworski LLP

(57) ABSTRACT

A method, apparatus, and system for providing ad hoc venue-cast content to a plurality of receiving access terminals within a venue boundary. Ad hoc content may be generated at an access terminal, transmitted to a venue-cast server, and broadcast to a plurality of venue-cast receiving access terminals within a venue. In addition to broadcasting the ad hoc content, a notification is given to the plurality of receiving access terminals, notifying them regarding the availability of the ad hoc content.

57 Claims, 11 Drawing Sheets

METHOD AND APPARATUS FOR AD HOC VENUE-CAST SERVICE

BACKGROUND

Electronic devices such as mobile telephone handsets and other terminals may be configured to receive a variety of multimedia content items, such as sports, entertainment, informational programs, or other multimedia content items via broadcast, multicast or unicast transmission.

Visitors to venues, such as theme parks, shopping malls, stadiums, trade shows, conventions, campuses, cruise ships, concert hall, airport, museum, and fairs, often have a plethora of options of attractions or items of interest within the venue. As such, these visitors often have a desire for venue related information. In traditional broadcasting, the smallest addressable area of broadcast content is the Local-area Operational Infrastructure (LOI), which covers a defined geographical region. For example, the smallest LOIs generally correspond to a metropolitan region.

As with all broadcasts over a large geographic area, difficulties arise in addressing content to consumers having varying interests within the broadcast area. Therefore, there is a need for a service that transmits on a venue scale so that venue specific information can be targeted to consumers within a smaller, venue area.

Mobile broadcast is a technology that enables attractive services to consumers, among which some of the key applications include mobile TV, mobile advertisements, and up-to-date media distribution via clip-cast and data-cast. However, scheduled broadcast content does not allow for the generation and transmission of unanticipated content. Thus, a need exists for a more interactive way of delivering venue specific information in a timely manner.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

Aspects described in the application enable the benefits of user generated or real time broadcast to be applied to specific venues.

Aspects include a method for providing ad hoc venue-cast content to a plurality of receiving access terminals within a venue boundary, comprising receiving, at a venue content server, unscheduled unicast content from a first access terminal within the venue; processing the ad hoc content; notifying the plurality of receiving access terminals within the venue of the availability of the ad hoc content; and transmitting the ad hoc content to the plurality of receivers within the venue.

The method may further include any of notifying the plurality of receiving access terminals within the venue of the termination of the transmission of the ad hoc content, buffering the ad hoc content prior to transmission, verifying that the first access terminal is authorized to generate ad hoc venue-cast content prior to processing the ad hoc content, verifying that the location of the first access terminal is within a boundary of the venue prior to processing the ad hoc content, transmitting the ad hoc content in connection with the transmission of scheduled venue content; transmitting the scheduled venue content on a first channel; and the ad hoc content on a second channel, generating a service guide with an indication of the transmission of the ad hoc content, providing such a service guide for download via a website, periodically transmitting such a service guide to the plurality of receiving access terminals, authorizing the access terminal to generate ad hoc venue content in advance of the receipt of the ad hoc content, transmitting an offer of a subscription to the access terminal upon receiving the ad hoc content, receiving an acceptance of the subscription offer, and authorizing the access terminal to generate ad hoc venue content based upon the subscription.

Additional aspects may include providing notification of the availability of the ad hoc content is provided between the periodic transmissions of the service guide, wherein the notification is a venue information block delivered via a control channel. The venue information block may be delivered using multicast (MATI) addressing.

Additional aspects may include terminating the transmission of the ad hoc content, where the termination is based on the termination of the received unicast ad hoc content or where the termination is based on a time limit determined at the venue content server.

Additional aspects may include receiving, at a venue content server, unscheduled unicast content from a second access terminal within the venue and transmitting the ad hoc content from the first and the second access terminals on separate channels or combining the ad hoc content from the first and the second access terminals and transmitting the combined ad hoc content on a single channel.

Additional aspects may include a computer program product, comprising a computer readable medium comprising code for causing a computer to receive, at a venue content server, unscheduled unicast content from a first access Terminal within the venue, code for causing a computer to process the ad hoc content, code for causing a computer to notify a plurality of receiving access terminals within the venue of the availability of the ad hoc content, and code for causing a computer to transmit the ad hoc content to the plurality of receiving access terminals within the venue.

Aspects may further include an apparatus for providing ad hoc venue-cast content to a plurality of receiving access terminals within a venue boundary, the apparatus comprising means for receiving, at a venue content server, unscheduled unicast content from a first access terminal within the venue, means for processing the ad hoc content, means for notifying the plurality of receiving access terminals within the venue of the availability of the ad hoc content, and means for transmitting the ad hoc content to the plurality of receiving access terminals within the venue.

Aspects may further include a venue-cast system for providing ad hoc venue-cast content to a plurality of receiving access terminals within a venue boundary, the system comprising a receiver for receiving, at a venue content server, unscheduled unicast content from a first access terminal within the venue, a processor for processing the ad hoc content, and a transmitter for notifying the plurality of receiving access terminals within the venue of the availability of the ad hoc content and for transmitting the ad hoc content to the plurality of receiving access terminals within the venue.

Aspects may further include a mobile device for receiving ad hoc venue-cast content, the mobile device comprising a receiver for receiving venue-cast transmissions, a venue-cast discovery component for discovering the availability of a venue-cast service, a processor for processing a venue-cast service guide, a monitor for monitoring for a notification regarding the availability of ad hoc venue-cast content, wherein the notification is received separate from the service guide, and a display for indicating the availability of ad hoc venue-cast content.

Additional aspects may include any of a communications component for selecting one of a plurality of venue-cast channels, a user interface for selecting the reception of ad hoc venue-cast content, a user interface for downloading the service guide via a website, an ad hoc content generating component for generating ad hoc venue-cast content, a transmitter for transmitting ad hoc venue-cast content via unicast to a venue-cast network, and a user interface for subscribing with the venue-cast network to receive authorization to transmit ad hoc venue-cast content.

Aspects may further include a method of receiving ad hoc venue-cast content at a mobile device comprising receiving venue-cast transmissions, discovering the availability of a venue-cast service, processing a venue-cast service guide, monitoring for a notification regarding the availability of ad hoc venue-cast content, wherein the notification is received separate from the service guide, and indicating the availability of ad hoc venue-cast content.

Aspects may further include a mobile device for receiving ad hoc venue-cast content, the mobile device comprising means for receiving venue-cast transmissions, means for discovering the availability of a venue-cast service, means for processing a venue-cast service guide, means for monitoring for a notification regarding the availability of ad hoc venue-cast content, wherein the notification is received separate from the service guide, and means for indicating the availability of ad hoc venue-cast content.

Aspects may further include a computer program product, comprising a computer readable medium comprising code for causing a computer to receive venue-cast transmissions, code for causing a computer to discover the availability of a venue-cast service, code for causing a computer to process a venue-cast service guide, code for causing a computer to monitor for a notification regarding the availability of ad hoc venue-cast content, wherein the notification is received separate from the service guide, and code for causing a computer to indicate the availability of ad hoc venue-cast content.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

The described aspects provide a transmission service on a geographic scale associated with the venue that is capable of receiving unscheduled ad hoc deliveries of content and distributing such ad hoc content via the venue transmission system thereby providing venue visitors with venue related information. A venue transmission is also referred to interchangeably herein as a venue-cast. application Ser. No. 12/569,792 titled APPARATUS AND METHODS OF PROVIDING AND RECEIVING VENUE LEVEL TRANSMISSIONS AND SERVICES filed on Sep. 29, 2009, Now issued as U.S. Pat. No. 8,635,645, the entire contents of which are incorporated herein by reference, describes aspects of a venue-cast system for transmitting scheduled venue related information.

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

Figure 1:
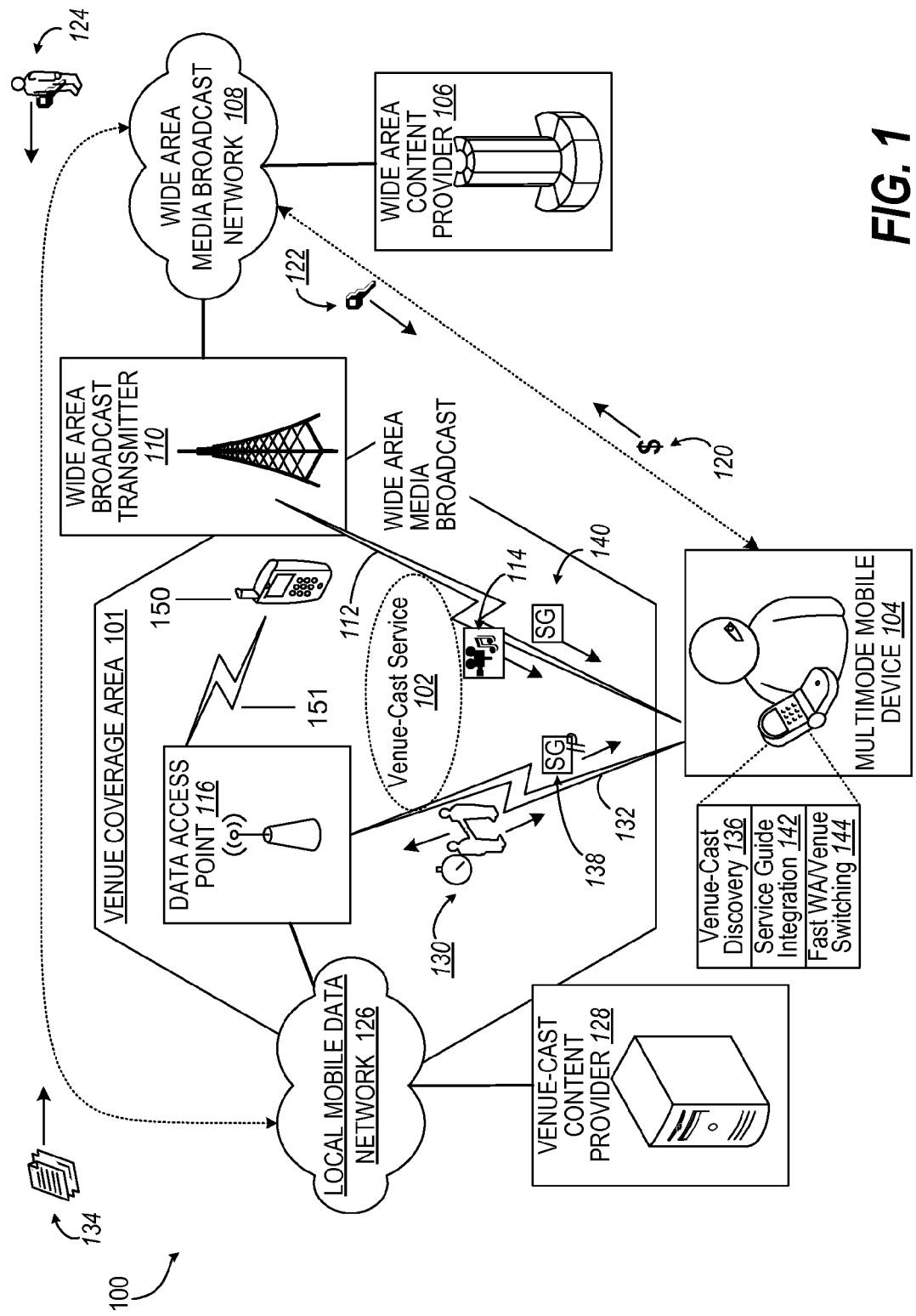
FIG. 1 depicts a block diagram of a mobile broadcast system enables an ad-hoc venue-cast service for consumers who use multi-mode mobile devices.

With reference to FIG. 1, a mobile broadcast system 100 enables a venue-cast service 102 provided by a local data access point 116 utilizing a unicast, multicast or broadcast technology to a venue coverage area 101. The venue-cast service may be integrated with a mobile broadcast service 112 provided by a broadcast network 108 for consumers who use multi-mode mobile devices 104. In some aspects, for example, the venue-cast service 102 can leverage a static Broadcast and Multicast Services (BCMCS). Alternatively or in addition, venue-cast service 102 can combine unicast, dynamic BCMCS, and adaptive resource allocation to maximize air link efficiency, and enable dynamic on-site service features such as venue application download to enhance service flexibility.

Venue-cast content is provided by venue-cast content provider 128 to access point 116, via venue-specific network wireless network 126, which transmits the venue-cast content to one or more mobile devices 104, for example, via a venue-cast channel 132. The underlying local area or venue-specific network can be WAN or hotspot deployment.

The venue-cast content may be scheduled venue-cast content such as pre-recorded content or scheduled live video feeds. In addition, the venue-cast content may include ad hoc type real time venue-specific content. An ad hoc venue-cast initiator 150 may initiate the distribution of ad hoc venue-cast content by transmitting the content via unicast 151 to a venue AP 116. The ad hoc content is transmitted to the local mobile data network 126 and to the venue-cast content provider 128. The ad hoc content may be buffered, processed, and prepared to be broadcast via the venue-cast system.

The venue-cast may be configured such that a mobile device 104 within the venue can receive the venue-cast without interfering with reception of a wide area signal. Wide area content may be received from a wide-area content provider 106 that is managed by a wide-area media broadcast network (e.g., the MediaFLO™ system) 108. A wide-area broadcast transmitter 110 transmits a broadcast 112 containing mobile television channels to the mobile device 104. In one aspect, this wide-area media broadcast 112 may include a plurality of media channels 114 (e.g., audio, video, etc.).

In the venue coverage area 101, mobile device 104 may be operable to receive, process, and switch between both the wide area channels 114 and venue-cast channels 132, enabling a user to experience both the wide area content as well as the venue-cast content. Thus, the described aspects enable mobile device 104 to provide a seamless user experience with access to venue-cast content via a unicast, multicast or broadcast transmission, with wide area content via a different broadcast transmission.

The availability of such a venue-cast transmission may be advertised in an Electronic Service Guide (ESG), herein also referred to interchangeably as a Service Guide (SG) that is periodically updated based on the frequency of change in programs. The SG update cycle may also depend on the maximum allocated bandwidth because the SG may be large and may require a significant amount of the venue-cast airlink. Thus, the desire for frequent updates must be balanced with a desire to reduce the load on the airlink.

The SG includes information regarding any ad hoc venue-cast channels that are currently available. The information received in the service guide may be used by device 104 to generate a user interface UI that identifies the channels of content that are currently available to the mobile device 104. For each available channel, the UI may indicate the channel type (e.g., local venue or wide area) as well as indications as to a media type. The UI may also indicate whether the channel includes user generated content.

In order to receive a venue-cast channel 132, the mobile device 104 is advantageously augmented by a venue-cast discovery component 136 that detects the availability of a venue supplemental service guide (SG) 138. For example, as part of periodically waking up to check for pages by a radio access network (RAN) (not shown), the mobile device 104 can also listen for an Internet Protocol (IP) packet announcing a current version of a venue supplemental service guide that can be requested via unicast or via a scheduled multicast or broadcast. If the mobile device 104 does not have the current version, for example, as determined based on a version number, then the mobile device 104 can obtain it based on the announcement. The mobile device 104 also may receive periodic updates to a wide-area service guide (SG) 140, which, for example, may be broadcast by the transmitter 110.

The service guide information for scheduled venue-cast content can be created in advance. However, ad hoc content is unscheduled and may become available and/or may terminate between the periodic transmissions of the SG. Therefore, a notification may be sent via the venue-cast system when such ad hoc content becomes available and when it terminates in order to notify venue-cast users about the availability of such ad hoc content. These notifications may be sent between the periodic transmissions of the SG. Thus, upon receiving ad hoc content at a venue-cast system, the SG will be updated to indicate its availability, and an intervening notification regarding the ad hoc content may be sent between the periodic transmission of the SG.

Notification sent at the time an ad hoc content channel becomes available allows a user to experience the ad hoc content as soon as it is available. Depending on the real time nature of the ad hoc content, this may be very important. Also, a notification sent at the tear down of an ad hoc channel informs a user that a channel is no longer available, so that the user does not attempt to tune to a channel that has been torn down.

In addition to having an unscheduled beginning and ending time, ad hoc content may also have varying lengths and varying quality. As the ad hoc content is user generated rather than venue generated, the picture or audio quality may be lower than the general venue-cast quality. The SG may include further information about the ad hoc content, such as a title, duration, and quality indication.

A SG integration component 142 may merge the information from the two SGs 138, 140 to generate a combined service guide, accessible via a user interface on mobile device 104, to provide a seamless user experience. In addition, a fast switch wide-area/venue switching component 144 keeps up-to-date on parameters for obtaining and presenting the venue-cast channels as well as the wide area broadcast channels, so that a user can rapidly switch between channels from the two different sources, in a manner similar to switching between two wide-area channels, which also enhances a seamless user experience.

Variations of the described system can also utilize other broadcast technologies with the benefit of aspects disclosed herein.

Another aspect includes providing a mechanism for efficiently billing the venue-cast services to an end user in a reliable way. This aspect includes suitable security features applied to the venue-cast transmission and providing a subscription to the venue-cast transmission. The venue-cast system may include a Conditional Access System to grant access to transmissions to mobile device users based on predetermined criteria. The predetermined criteria may limit access to dedicated devices, to devices within a predefined geographic boundary, or to devices with a subscription to the venue transmission system. The venue-cast service may be part of the MediaFLO service package. In addition, users may subscribe to the venue-cast service for a period of time, such as for a day spent at the venue. A subscription may also be offered and obtained on the spot, via the venue-cast system.

Exemplary security and billing aspects of a venue-cast system are depicted in FIG. 1. In some aspects, the multimode mobile device 104 subscribes, depicted as paying a fee 120, to the venue-cast network 108 in order to receive keys (e.g., decryption) 122 that enable access to broadcast 112 and venue-cast 132. For example, the multimode mobile device utilizes a cellular or wireless two-direction data channel in order to subscribe (not shown). The identity of this mobile device 104 and subscription keys, depicted at 124, are shared with a local mobile data network 126 (e.g., EV-DO) that receives venue-cast content from provider 128 (e.g., live video feed; venue-specific clips; etc) and distributes it by data packet unicast or multicast via AP 118.

Authentication, depicted at 130, over a bi-directional venue-cast wireless channel 132 can serve as a usage measure that is communicated from the local mobile data network 126 to the wide area media broadcast network 108, as depicted at 134, for purposes such as compensation for a venue (sporting franchise, theme park, etc.).

Figure 2:
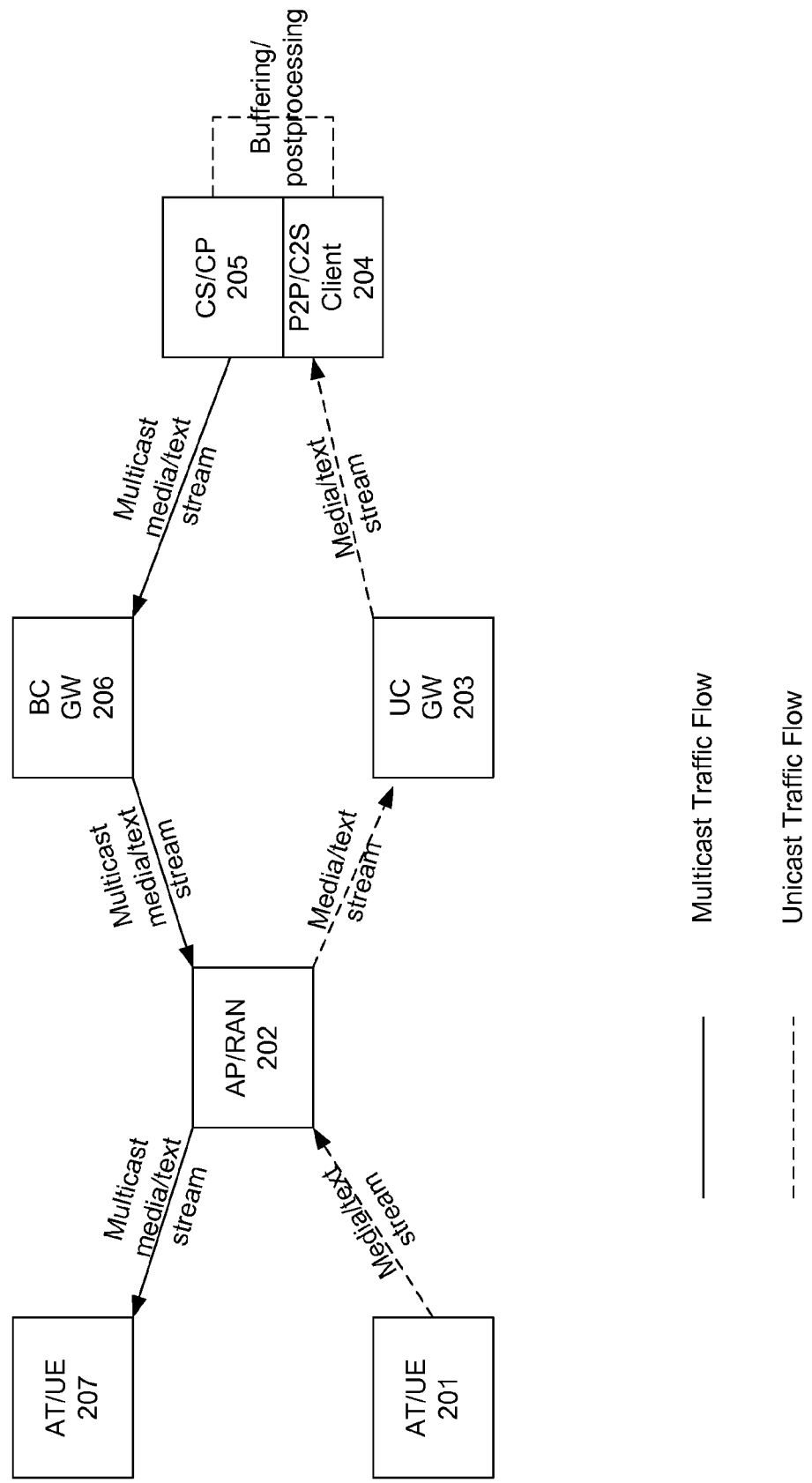
FIG. 2 depicts a delivery diagram of traffic flow between a user generating ad hoc venue-cast data, a venue-cast system, and a user receiving the venue-cast.

FIG. 2 illustrates an exemplary method of receiving user generated material within a venue and linking that material to a venue-cast transmission. In FIG. 2 an access terminal (AT), herein also referred to as user equipment (UE), 201 generates and transmits content to the venue-cast system. The media or text content is transmitted as a unicast traffic flow to an access point (AP) or RAN 202. The AP/RAN transmits the content to a unicast gateway (UC GW). The unicast gateway then transmits the content to the venue-cast client server 204/205. The venue-cast system includes at least two components, a point to point (P2P) or client to server (C2S) component 204 that receives the user generated, ad hoc content and a content server unit CS/CP 205. The unicast content of media or text received from the AT 201 via the AP/RAN 202 and UC GW 203 is converted by the venue-cast server to be transmitted over the venue-cast system. The ad hoc content is linked to or merged with the other, scheduled venue-cast content being transmitted over the venue-cast system so that venue-cast users 207 may receive the ad hoc content. Linking the ad hoc content to the scheduled venue-cast content may include buffering and processing the ad hoc content.

The venue-cast server 205 transmits the processed ad hoc content to a broadcast gateway (BC GW) 206. FIG. 2 illustrates the venue-cast server sending the ad hoc content as a multicast media or text stream. The content is then transmitted to an AP/RAN 202 and broadcast to other users in the venue having AT/UE 207. The AP/RAN 202 may be the same AP/RAN 202 to which the ad hoc content was originally sent, or it may be a different AP/RAN.

Thus, a venue-cast system capable of incorporating ad hoc, user generated content may utilize a point-to-point or client-to-server connection established between the ad hoc venue-cast initiator 201 and the venue-cast broadcast content server 205. The content server 205 buffers and mergers the unicast ad hoc content with the scheduled venue-cast content and transmits the combined content to be broadcast over the venue area. Once the ad hoc content has been processed, the ad hoc venue-cast content can be transmitted over the standard venue-cast infrastructure along with the scheduled venue-cast transmission to the dedicated venue area.

Although the venue-cast delivery method has been described in this example as broadcast, it is noted that the delivery method may be unicast or multicast.

Figure 3:
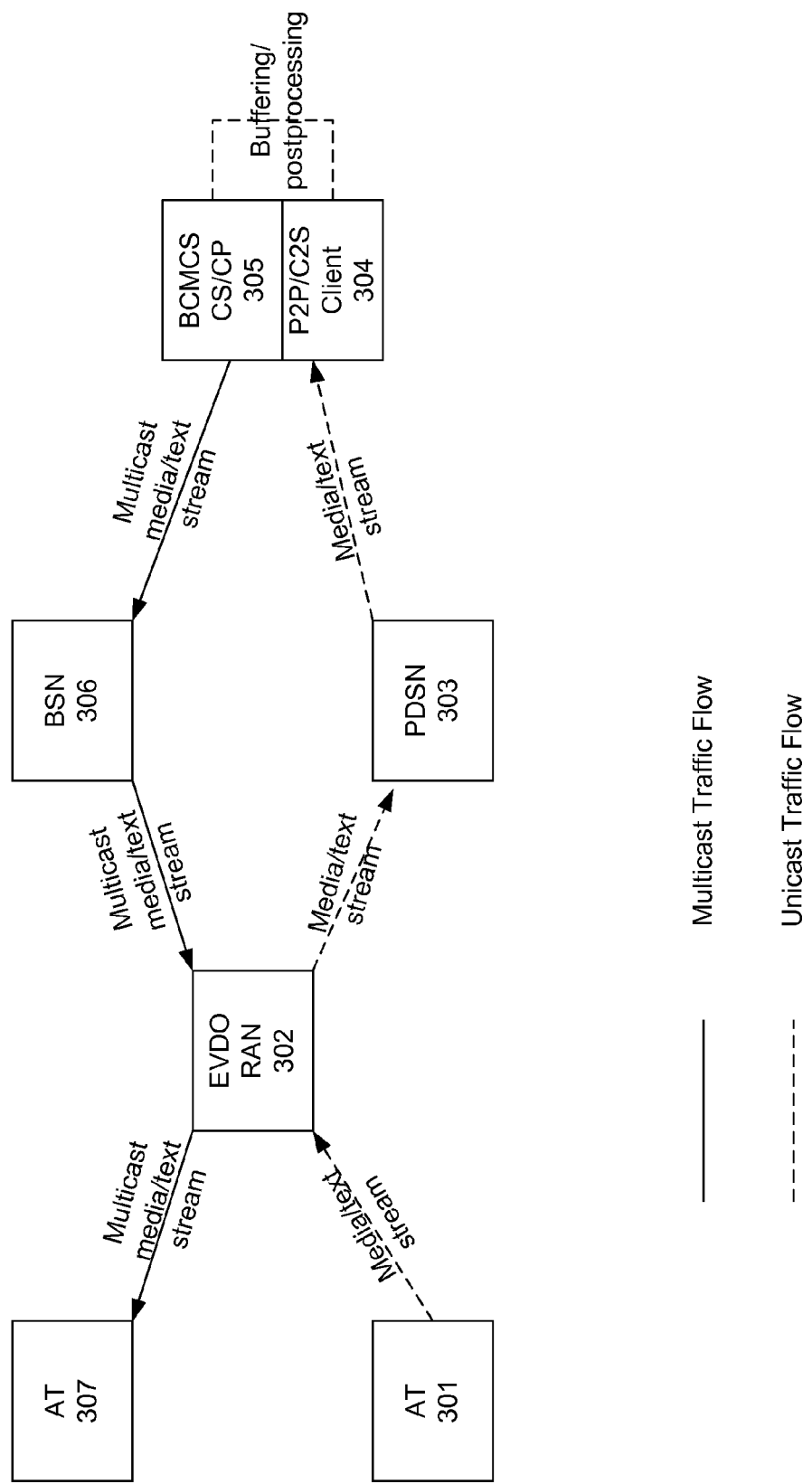
FIG. 3 depicts another delivery diagram of traffic flow between a user generating ad hoc venue-cast data, a venue-cast system, and a user receiving the venue-cast.

FIG. 3 illustrates an exemplary network architecture for an ad hoc venue-cast system using an EV-DO type network. AT 301 initiates the ad hoc transmission by transmitting content to the venue-cast server 304/305. The content is transmitted to an EVDO RAN 302 that transmits the content to a packet data service node (PDSN) 303. The PDSN transmits the content to a P2P or C2S component 304 in the venue-cast server. The ad hoc content is buffered and processed as discussed in connection with FIG. 2. Then, the BCMCS CS/CP 305 transmits the ad hoc content along with scheduled venue-cast content as a multicast stream. The BCMCS transmits the content to the venue via a broadband service node (BSN) 306 and an EVDO RAN 302. The RAN 302 then multicasts the content to any number of ATs 307 within the venue. As noted above, the RAN 302 may be the same as the RAN 302 that received the initial ad hoc content as a unicast from AT 301, or it may be a different RAN. In addition, the ad hoc material may be transmitted to the venue-cast users 307 via either unicast or multicast.

The ad hoc content may be broadcast as a separate channel in the venue-cast. More than one AT 301 may initiate the transmission of ad hoc venue-cast content. Thus, there may be more than one channel of ad hoc content in the venue-cast. Alternatively, the ad hoc material received from multiple ATs 301 may be combined into one channel.

Figure 4:
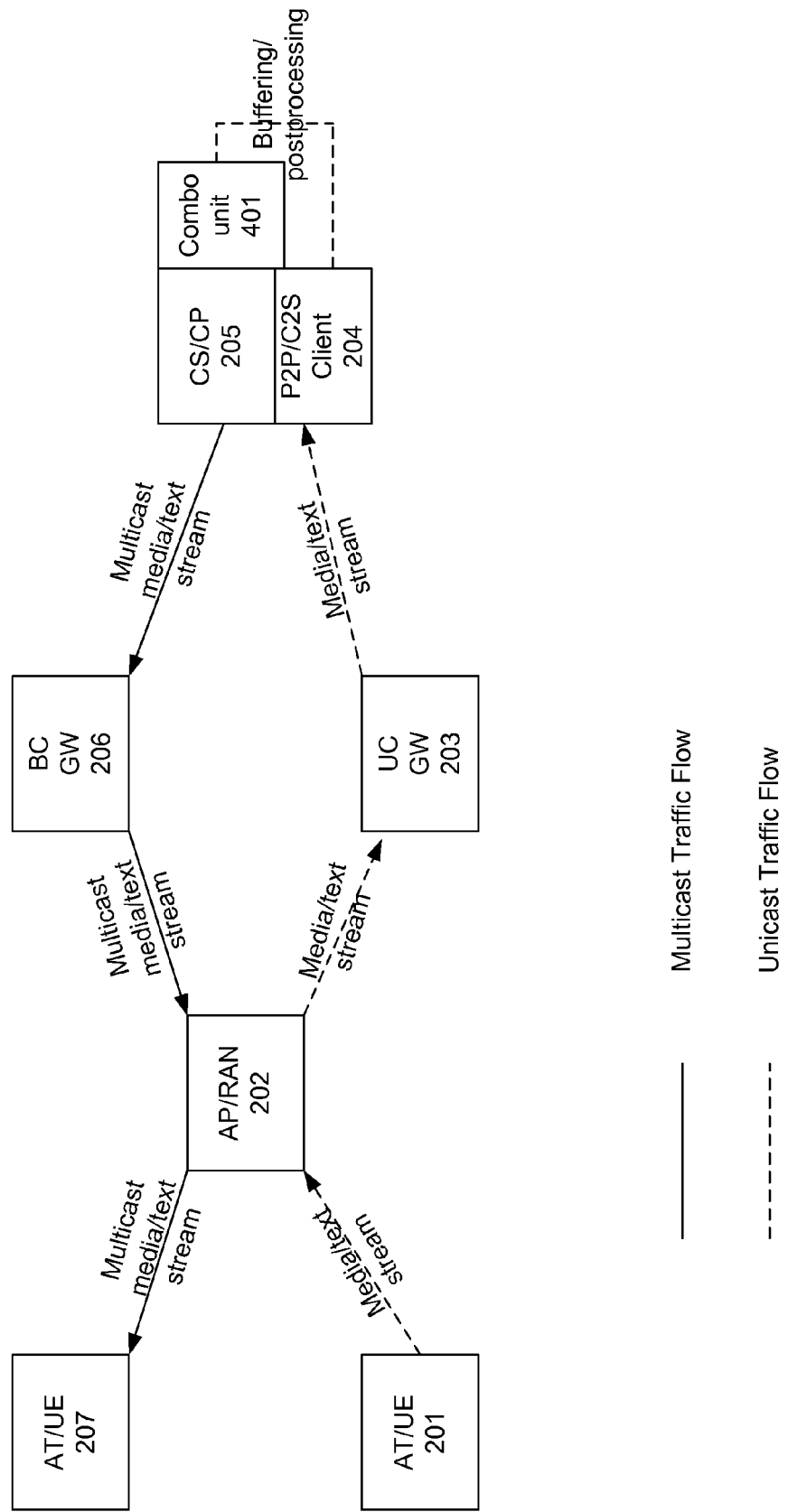
FIG. 4 depicts another delivery diagram of traffic flow between a user generating ad hoc venue-cast data, a venue-cast system, and a user receiving the venue-cast.

FIG. 4 illustrates a network architecture similar to FIG. 2, where the content server 205 includes an additional component 401 for combining ad hoc material received from multiple users. The combination component 401 may include a user interface that provides the content in a manner that allows a venue-cast editor to edit and combine the multiple clips of ad hoc content before they are broadcast. The combination component 401 may also automatically combine the content received from multiple ad hoc content initiators 301 based on a predefined characteristic. For example, the ad hoc material may be automatically edited and combined based on a predefined timeframe for the ad hoc broadcast. Although the venue-cast server in FIG. 4 includes the combination component 401, ad hoc content may be broadcast as a combined channel or on multiple individual channels depending on the need to provide the ad hoc content in real-time.

The ad hoc venue-cast content is received and transmitted by the venue-cast system in an unscheduled manner. This allows a more real-time user experience. However, a starting and ending time for the content is unknown prior to receipt of the content at the venue-cast server.

As the beginning and ending time of an ad hoc transmission is not known in advance, venue-cast receivers will not know when to look for ad hoc venue-cast transmissions unless a notification is sent to them. Thus, a venue-cast system incorporating ad hoc transmissions may include a notification that is sent to users when an ad hoc broadcast stream is established. This notification should occur in a timely manner as the real-time nature of ad hoc content may be important. The venue-cast system may further include a notification to the user when the ad hoc broadcast stream is torn down. The user should be notified before the media buffer is emptied. One exemplary way to provide the notifications regarding the establishment and tear down of an ad hoc venue-cast transmission is to extend the service discovery mechanism for the venue-cast transmission.

Figure 5A:
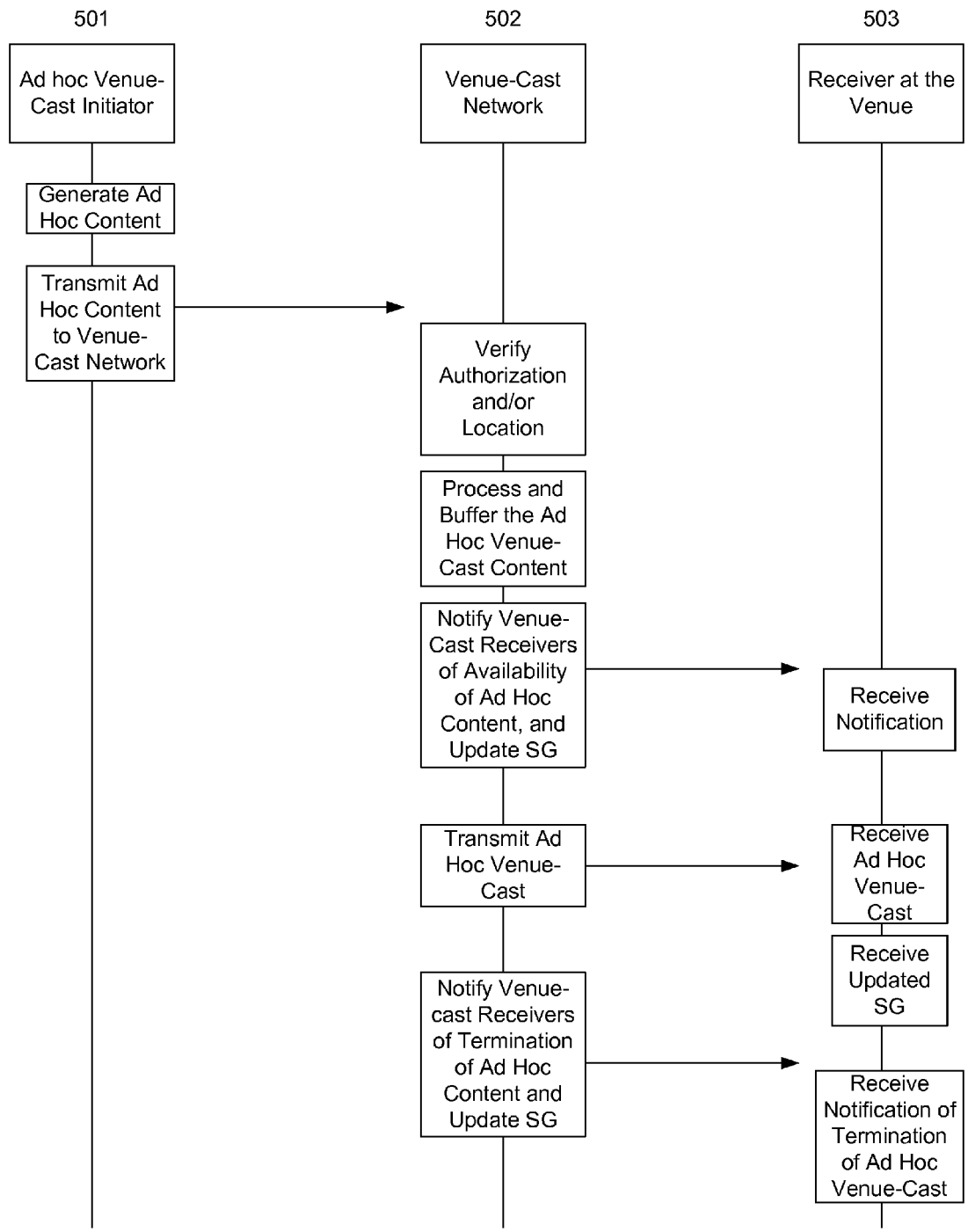
FIGS. 5A and 5B depict traffic flow between a user generating ad hoc venue-cast data, a venue-cast system, and a user receiving the venue-cast.

FIG. 5A illustrates a method of receiving ad hoc content and incorporating the ad hoc content into a scheduled venue-cast. An ad hoc venue-cast initiator at AT 501 generates ad hoc content at 511 such as by recording an event or writing a comment. The initiator 501 then transmits the ad hoc content to a venue-cast network 502 at 512. When the venue-cast network 502 receives the transmission, it verifies that 501 is an authorized user to generate ad hoc venue-cast content at 513 and may also verify that ad hoc content generator 501 is located within the venue.

Certain ATs may be authorized in advance. Alternatively, an AT may subscribe to a package in order to receive authorization to initiate an ad hoc venue-cast. Such a subscription may be obtained, for example, wirelessly while the AT is in the venue.

Once the ad hoc content generator 501 is identified the venue-cast network 502 processes and buffers the ad hoc content and transmits a notification to venue-cast receivers that ad hoc content is available at 514 and 515.

A receiver 503 in the venue receives the notification identifying the availability of ad hoc venue-cast content at 516. The venue-cast network 502 updates the service guide (SG) and begins transmitting the ad hoc venue-cast at 517. At 518, the receiver 503 receives the venue-cast transmission and at 519, the receiver receives the periodic transmission of the SG having updated information regarding the ad hoc content. At termination of the ad hoc venue-cast, the venue-cast network 502 notifies the venue-cast receivers 503 of the termination of the ad hoc venue-cast and updates the SG at 520. The receiver receives notification of the termination of the ad hoc venue-cast at 521.

Figure 5B:
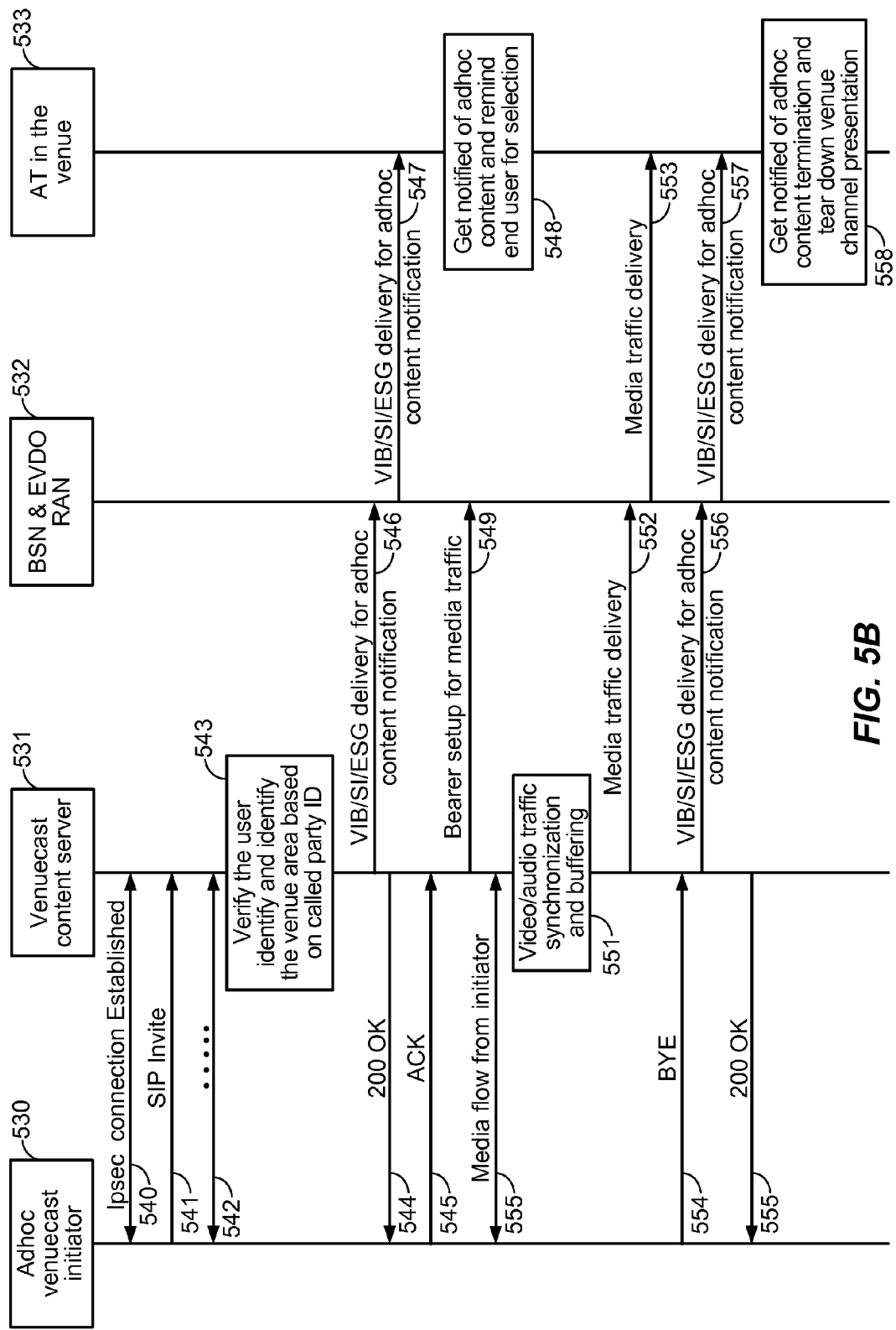

FIG. 5B illustrates exemplary aspects of a method of providing notification of the establishment and tear down of an ad hoc venue-cast transmission. An ad hoc venue-cast initiator at AT 530 initiates the unicast transmission of ad hoc content to a venue-cast server 531 through the establishment of a connection 540 between the initiator 530 and the venue-cast content server 531. For example, a Session Initiation Protocol (SIP) invite 541 may be sent from the initiator 530 to the venue-cast content server 531. The ad hoc content initiator 530 may also provide an indication of which venue the user-generated content is intended for.

At 543, the venue-cast content server 531 verifies that the user 501 is authorized to submit ad hoc venue-cast content by verifying the identity of the user and possible also verifying the venue area based on the called party ID. In order to control the receipt of ad hoc content from initiators, security measures may be provided that limit ad hoc initiators to authorized ATs. There may be a level of exchange above the IP level that determines whether the venue-cast content server recognizes the ad hoc content initiator, or the AT, in order to determine whether the venue-cast content server can accept the content from the ad hoc content initiator. Certain ATs may be authorized in advance. Alternatively, an AT may subscribe to a package in order to receive authorization to initiate an ad hoc venue-cast. Such a subscription may be obtained, for example, wirelessly while the AT is in the venue.

Once the user 530 is identified, the venue area of the user 530 is identified. The venue area identification may be based on the called party ID. The venue-cast content server 531 transmits a message to the user 530 at 544 noting authorization. Once the user acknowledges this message at 545, a stream of content is transmitted from the user 530 to the venue-cast content server 531 at 550.

When the user 530 and venue area are identified at the venue-cast content server 531, the venue-cast content server transmits a notification that ad hoc content is available at 546. BSN/EVDO RAN 532 may deliver the notification to ATs in the venue at 547. The ATs 533 receive the notification at 548. For example, FIG. 5 illustrates an exemplary Venue Information Block (VIB) type notification that is transmitted via a control channel to notify venue-cast users 533 that an ad hoc transmission is available. This may include notification of a new venue-cast channel on which the ad hoc content will be broadcast and notification that the traditional ESG update cycle is changed/expedited. All of the venue service applications are notified of the new ad hoc channel. Thus, these services update the SG based on the new timeline advertised by the VIB. Upon upgrading the SG, the venue applications provide notification to the end users 533 of the ad hoc channel's availability for user selection.

A VIB notification may be delivered via a control channel using Multicast Access Terminal Identifier (MATI) addressing for venuecast service subscribers for instant venue service availability notification. In addition to service notification, the VIB may be extended for the instant ad hoc channel notification. The venue-cast content server 531 then establishes a setup for media traffic at 549.

As noted above, the ad hoc venue-cast initiator 530 transmits the ad hoc content at 550. As the ad hoc content is received from the initiating user 530 at the venue-cast content server 531, the ad hoc content is merged with the scheduled venue-cast content such as through traffic synchronization and buffering at 551. As discussed above, this may include establishing a separate channel for the ad hoc content. Then, the venue-cast content server 531 delivers the processed ad hoc content to the BSN and EVDO RAN 532 at 552. The BSN and EVDO RAN 532 then broadcasts the ad hoc content to the venue-cast users 533 at 553.

When the ad hoc venue-cast initiator 530 is finished sending content, the initiator 530 ends the content transmission at 554. At this time, the venue-cast content server 531 notifies the other venue-cast users 533 that the ad hoc broadcast is ending or is no longer available at 556. This notification is sent to the BSN & EVDO RAN that broadcasts the notification to users 533 at 557. The venue-cast content server also acknowledges the end of the transmission to the initiator 530 at 555. The AT receives the notification that the ad hoc content will no longer be available at 558.

A venue-cast AT monitors for venue-cast content and is notified of the venue-cast service availability when present in a venue. This may include monitoring for a SG update. The SG update may be based on the normal period designated by the venue content server. The normal period may be chosen in order to balance the need for updates in the service guide with the need to reduce the load on the airlink. The SG may be large and place a substantial load on the airlink. Thus, the frequency of the SG update may be reduced. Ad hoc, user generated content may begin and/or end between the timeframe for a SG update. As the next scheduled SG update may cause too long of a wait, a small notification is transmitted to notify the venue-cast users regarding the ad hoc venue-cast content.

Ad hoc venue-cast content may be for a number of different applications that allow increased user interactivity that enrich a user's venue experience. One exemplary application is a venue specific chatroom. A user may create a venue specific chatroom and exchange comments and media clips with all of the users receiving the venue-cast. Another exemplary application is individual live casting. A user may transmit to other users in the venue a live media stream of an event spotted by the user. This content may be transmitted in a manner that would allow it to be remotely viewed via a website as well. Such a live transmission may include interviews of a person of interest at the venue.

One example of live casting type ad hoc content is ad hoc pre-game interviews of people of interest at a sports venue. An interview may be recorded at an AT when an athlete becomes available. A recoding of the interview is transmitted, such as via a P2P transmission, to the venue-cast system. At the venue-cast system, the interview is processed, which may include any of buffering, transcoding, and conversion in a manner to be broadcast along with other, scheduled venue-cast content for the sports venue. Thus, the interview may be integrated with or linked to the scheduled venue-cast content. The interview may be broadcast on a separate channel. More than one interview may become available at the same time. Thus, multiple ad hoc channels may be provided.

Once the venue-cast system begins to receive the interview, it transmits a notification to the ATs receiving the venue-cast to inform them that the interview, or the channel on which it is being broadcast, is available. Once the interview is finished, another notification is sent to the ATs receiving the venue-cast to inform them that the interview is over and that the channel will no longer be available. In this manner, a person viewing the interview will know to change to a different channel. Also, this will inform a person viewing the service guide or attempting to tune to the channel that the interview is no longer available.

The ad hoc venue-cast may be applied to a variety of different venues. For example, the ad hoc type venue-cast may provide enhanced interactivity in a venue-cast system at theme parks, sports venues, campuses, shopping centers, trade shows, conventions, cruise ships, concert halls, airports, museums, fairs, etc.

Figure 6:
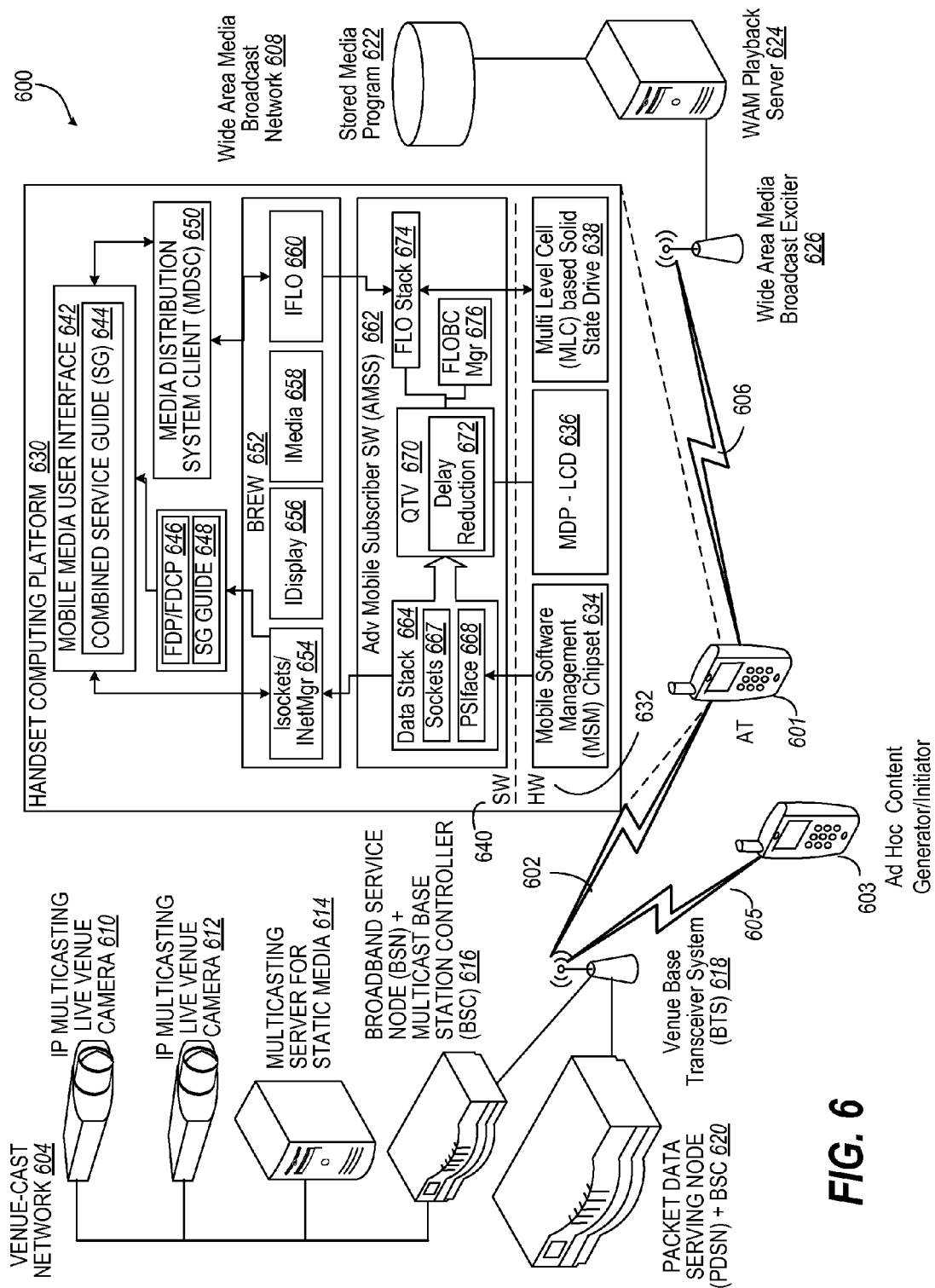
FIG. 6 illustrates a depiction of a user interface of a mobile communication device that provides a seamless user experience between the wide area and venue-cast content while advantageously annotating the types of content.

In FIG. 6, in another aspect, in a mobile communication system 600, a mobile device 601 may include a computing platform 630 for supporting these dual communication channels, integration of media usage, etc. Further, mobile device 601 may include a hardware platform 632 having a mobile software management (MSM) chipset 634 that serves as processor and controller. A Mobile Display Projector (MDP) or Liquid Crystal Diode (LCD) display 636 supports presentation of mobile content. A Multi-Level Cell (MLC) based Solid State Drive 638 provides storage for programs and data for the computing platform 630.

With regard to software components 640 of the computing platform 630, a mobile media user interface 642 enables a user to interact with a combined service guide (SG) 644 on the MDP-LCD display 636. This SG 644 is merged by application level processing from data received from different sources and protocols. In particular, a file delivery protocol and/or file delivery control protocol (FDP/FDCP) component 646 adapted for IP serves as a transport mechanism for one portion of a service guide 648. A media distribution system client (MDSC) component 650 routes content. These applications 646, 648, 650 are supported by a BREW™ operating environment (QUALCOMM, San Diego, Calif.) 652, including an ISockets/INetMgr component 654, an Display component 656, an IMedia component 658, and an IFLO component 660.

The BREW™ environment 652 is supported by an Advanced Mobile Subscriber Software (AMSS) component 662 including a data stack 664 with sockets 667 and PSIface 668, including a (QTV) component 670 that serves as a CODEC for preparing the media for presentation and advantageously includes a delay reduction component 672 that dynamically adjusts buffering to mitigate display disruptions. The AMSS component 662 has a FLO stack 674 and FLOBC Manager 676 for supporting the receipt of FLO content.

In an exemplary implementation, integrated viewing experience for venue-cast over BCMCS and FLO TV over Media-FLO™ system playback solution is provided. The computing platform 630 supports fast switching (e.g., 2-3 seconds or less) between venue-cast and FLO channels, providing a seamless user experience. In some aspects, the optimized UI design offers compelling venue user experience by providing the user with an option to select from multiple venue and TV networks, by providing a dynamic combination of SG displays depending on user choice of networks, and by providing active prompts to alert the user of venue-cast availability upon entering a venue. Additionally, in some aspects, service terminates smoothly upon departing from venue. In one aspect, the computing platform 630 can comprise a MediaFLO™ CALLISTO™ FFA (form factor accurate) handset based on MFLO SW version 3.5 and EV-DO MSM 6801 commercial build, EV-DO CSM 6800 SW Rel. 1.4.

The mobile device in FIG. 6 is illustrated as being able to receive a venue-cast data 602 by an air link from a venue-cast network 604 and wide area content 606 in a broadcast coverage area from a wide area broadcast network 608. The wide area broadcast network 608 has media programs stored in a repository 622 accessed by a wide area media playback server 624 and disseminated by a broadcast exciter 626 (e.g., Rhode & Schwartz Broadcast Tester for generating FLO signals).

The venue-cast network 604 may include scheduled venue-cast content such as multiple IP multicasting live venue cameras 610, 612 or static media stored on a multicasting server 614 (e.g., Apple Darwin multicasting server for MPEG4,
H264 and audio content). The venue-cast network 604 may also include the ability to receive and transmit ad hoc content 605. This venue content, whether scheduled or ad hoc, 602 is routed by a broadband service node (BSN) 616 that also serves as a multicast base station controller (BSC) for a venue base transceiver system (BTS) 618, which also may be in communication with a PDSN+BSC router 620. For example, an ad hoc venue-cast initiator 603 may transmit ad hoc content to the venue-cast content server via an AP and PDSN as illustrated in connection with FIGS. 3 and 6. The initial transmission 605 is a unicast transmission. Once the ad hoc content has been processed by the venue content server, the ad hoc content may be broadcast, such as by signal 602, along with the other scheduled venue content. AT 601 will be notified regarding the availability and termination of such as hoc content as discussed in connection with FIG. 5.

Figure 7:
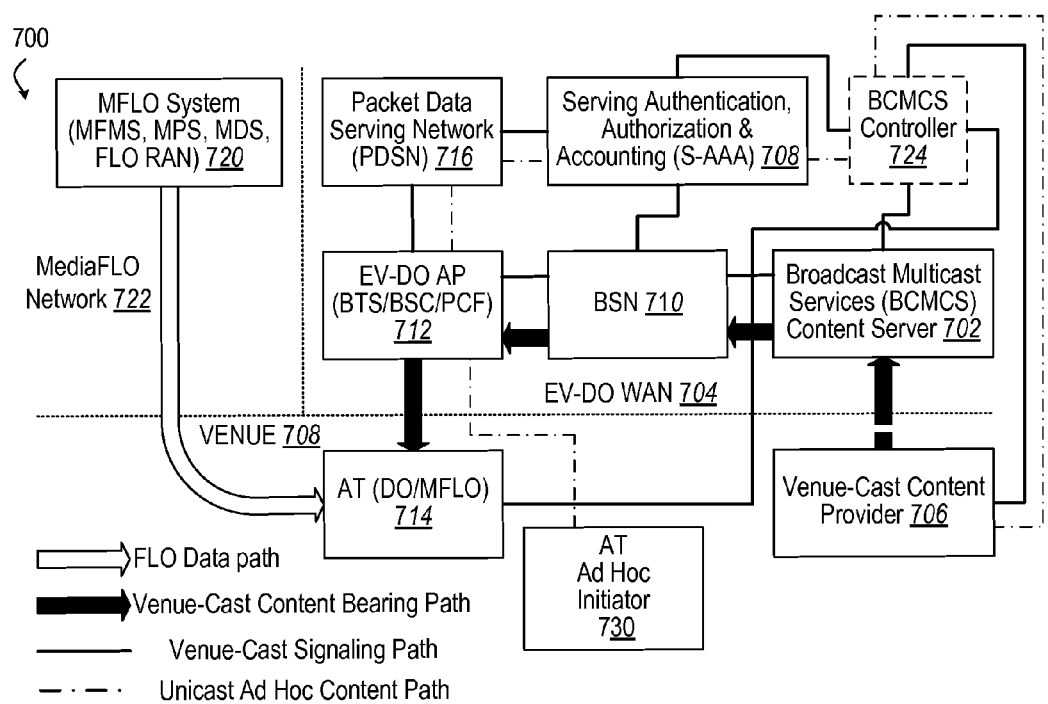
FIG. 7 depicts a block diagram of a venue-cast system that leverages use of a static BCMCS system.

In FIG. 7, in another aspect, a venue-cast system 700 leverages use of a static BCMCS system, depicted as a BCMCS content server 702 of an EV-DO WAN 704 that receives venue-cast content from a provider 706 at venue 708. The BCMCS content server 702 provides venue-cast signaling and content to a broadband service node (BSN) 710, which in turn provides the venue-cast signaling and content to an EV-DO AP (BTS/BSC/PCF) 712 that wirelessly transmits the venue-cast content as packetized data to an AT (e.g. a multimode DO/MediaFLO device) 714 and sends venue-cast signaling to a PDSN 716 for coordinating with a serving authentication, authorization and accounting (S-AAA) component 708. An MediaFLO system 720 of a MediaFLO™ network 722, which may include one or more of a MediaFlo Management System (MFMS), a MediaFlo Provisioning System (MPS), a media distribution system (MDS), and a FLO radio access network (FLO RAN), provides broadcast FLO content to the AT 714. In some implementations, a BCMCS controller 724 handles authentication and other functions and has interfaces with the S-AAA 708, AT 714, BCMCS content server 702, and venue-cast content provider 706.

In addition to scheduled venue-cast content initiated by the venue-cast content provider 706, ad hoc type venue-cast content may be initiated by AT 730. This unicast content is received by the EV-DO AP 712 and communicated to the venue-cast content provider 706 via PDSN 716 and BCMCS 724/702. The ad hoc content is processed and buffered and included as venue-cast content to be broadcast to AT 714.

In some aspects, all BCMCS network entities except the content provider may reside in the operator network. Also, a venue content originator provides service content and a service guide to the BCMCS content server.

Figure 8:
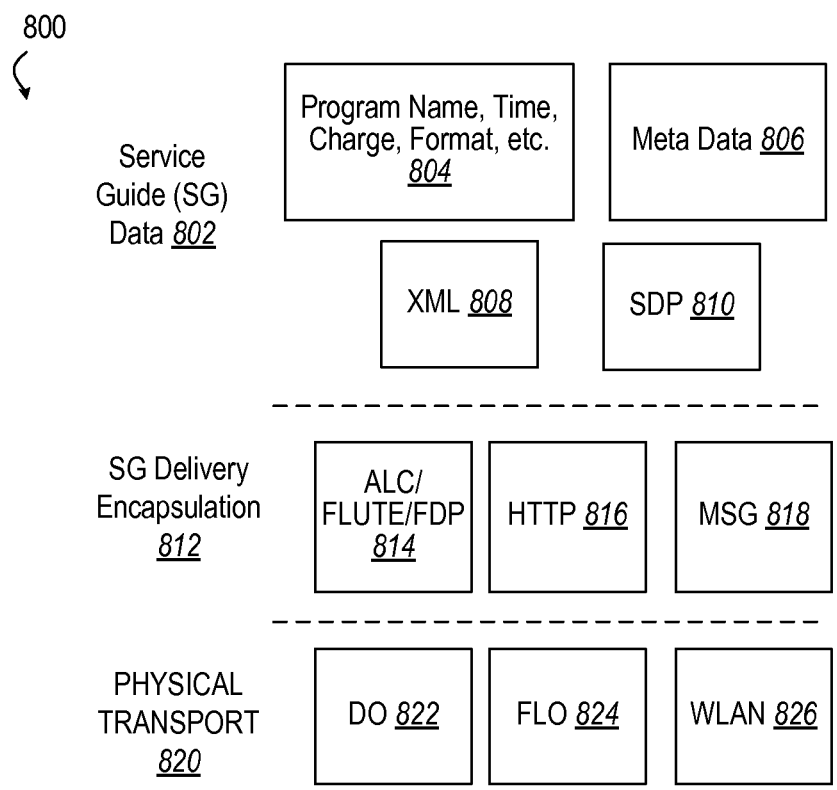
FIG. 8 illustrates a venue-cast service guide structure.

In FIG. 8, in one aspect, a venue-cast service guide (SG) structure 800 is depicted wherein SG data 802 comprises a program name, time, charge, format, etc. block 804, a meta data block 806, an XML block 808 and an SDP block 810. SG Delivery Encapsulation 812 comprises one or more of an ALC/FLUTE/FDP block 814, an HTTP block 816, and a MSG block 818. Physical transport 820 is provided by one or more networks, such as DO 822, FLO 824, and WLAN 826.

In one aspect, the FLO-DO-WAN venue-cast SG structure is designed based on that of a MediaFLO MPG. Alternatively, an OMA-based SG structure design for BCMCS is also available based on OMA standards. For example, a venue-specific addition to the service guide structure may include venue location information. The physical transport technology is provided with the venue-cast and associated parameters. Further, in an aspect, an association between venue channels and MediaFLO channels can be complimentary content. With regard to delivery, in an aspect, the SG for venue-cast is delivered via a DO air link. In other aspects, SGs of venuecast and FLO channels can be integrated on the AT at a presentation level via a unified user interface (UI) application.

In one aspect, venue-cast SG/SG metadata are delivered via two file-cast sessions to the ATs. In an aspect, for example, a file delivery format that is the same as is used for a clip-cast can be used for the SG data. Further, for example, candidate transmit protocols include ALC, FLUTE, and modified FDP/FDCP. In some aspects, the SG/SG metadata file are delivered on separate BCMCS flows. In some aspects, SG and/or SG metadata properties include a data volume that is relatively small (e.g., in units of tens of bytes) and can be transmitted within one channel cycle (CC). Another property of SG or SG metadata, such as versioning, allows the AT to monitor for a change in the SG to avoid unnecessarily receiving duplicate SG. Allowing less frequent SG file transmission can reduce the air link bandwidth consumption.

Additionally, in other aspects, SG file properties include a data volume that can be relatively large (e.g., up to tens of kilobytes). In such aspects, a complete SG file transmission can take multiple Broadcast Overhead Period channel cycles (CC's). With regard to delivery timing considerations, in some aspects, SG metadata is delivered more frequently than a full SG. For example, in some aspects, a content server initiates the SG metadata file delivery session every Broadcast Overhead Period CC. Further, the content server can initiate the SG file delivery session periodically, and for each delivery session, the SG file can be repeated multiple times.

A venue-cast service discovery component discovers the presence of venue-cast network so that the further discovery of the service content of the venue-cast network can be facilitated by the integrated program guide. In one aspect, a radio access network (RAN) detection component can leverage unique characteristics of an underlying air-interface that delivers the venue-cast. For example, if the air interface is EV-DO BCMCS, the service can be discovered by looking for the BCMCS flow ID of the venue-cast service guide sent in broadcast overhead message (BOM) on the DO control channel. In another aspect, a location-based mechanism is utilized to aid in discovering venue-specific services. For example, the venue-cast availability by location (e.g., longitude/latitude coordinates, or cellular BTS ID) can be preprogrammed in the mobile device. Upon entering the designated location, the mobile device looks for the service guide and notifies the user if the service guide is found. In yet another aspect, a user-triggered mechanism can perform service discovery. Further, in some aspects, these discovery techniques can be autonomously triggered. Alternatively or in addition, if the user is aware of the service due to outside information, the user could activate the user triggered mechanism to start the application, which then triggers the terminal to search for venue-cast service guide.

The format, design and delivery of the venue-cast service guide (SG) may include the aspects described in application Ser. No. 12/569,792 titled APPARATUS AND METHODS OF PROVIDING AND RECEIVING VENUE LEVEL TRANSMISSIONS AND SERVICES filed on Sep. 29, 2009, now issued as U.S. Pat. No. 8,635,645, previously incorporated by reference herein.

The service guide may be delivered to the AT in any manner. For example, the following are two illustrative options, which should not be construed as limiting.

Option 1: Multicast of service guide delivery. In this case the service guide is sent as one of the broadcast flows in the venue-cast network. The transmission duration should be often enough for new users to be able to quickly detect the service guide. For terminal power efficiency, the transmission of the service guide could be separated into full guide and guide metadata, where the full guide is sent over longer intervals (e.g., every minute), while the guide metadata that contains the service guide version number can be sent more frequently (on the order of 100 ms). As such, an AT may be configured to compare that last version number obtained by the AT with the transmitted version number, and if there is a difference, then the AT is triggered to obtain either the whole service guide or service guide updates representing the changes between the version number of the service guide on the AT and the version number of the latest service guide being transmitted.

Option 2: Unicast service guide delivery. Once the venue-cast service is discovered the user could be directed by the application to a local website to download the service guide.

Various aspects are described herein in connection with a terminal, which can be a wired terminal or a wireless terminal, herein referred to interchangeably as a mobile device. A terminal can also be called a system, device, subscriber unit, subscriber station, mobile station, mobile, mobile device, remote station, remote terminal, access terminal, user terminal, terminal, communication device, user agent, user device, or user equipment (UE). A wireless terminal or mobile device may be a cellular telephone, a satellite phone, a cordless telephone, a Session Initiation Protocol (SIP) phone, a wireless local loop (WLL) station, a personal digital assistant (PDA), a handheld device having wireless connection capability, a computing device, or other processing devices connected to a wireless modem. As used herein, a mobile device may be a dedicated, purpose-built mobile device such as a handset or may be a multi-purpose mobile device that can be used beyond a particular venue. A dedicated device or a multi-purpose mobile device may include core hardware to receive transmitted data such as data broadcast/unicast over an air interface.

Figure 9:
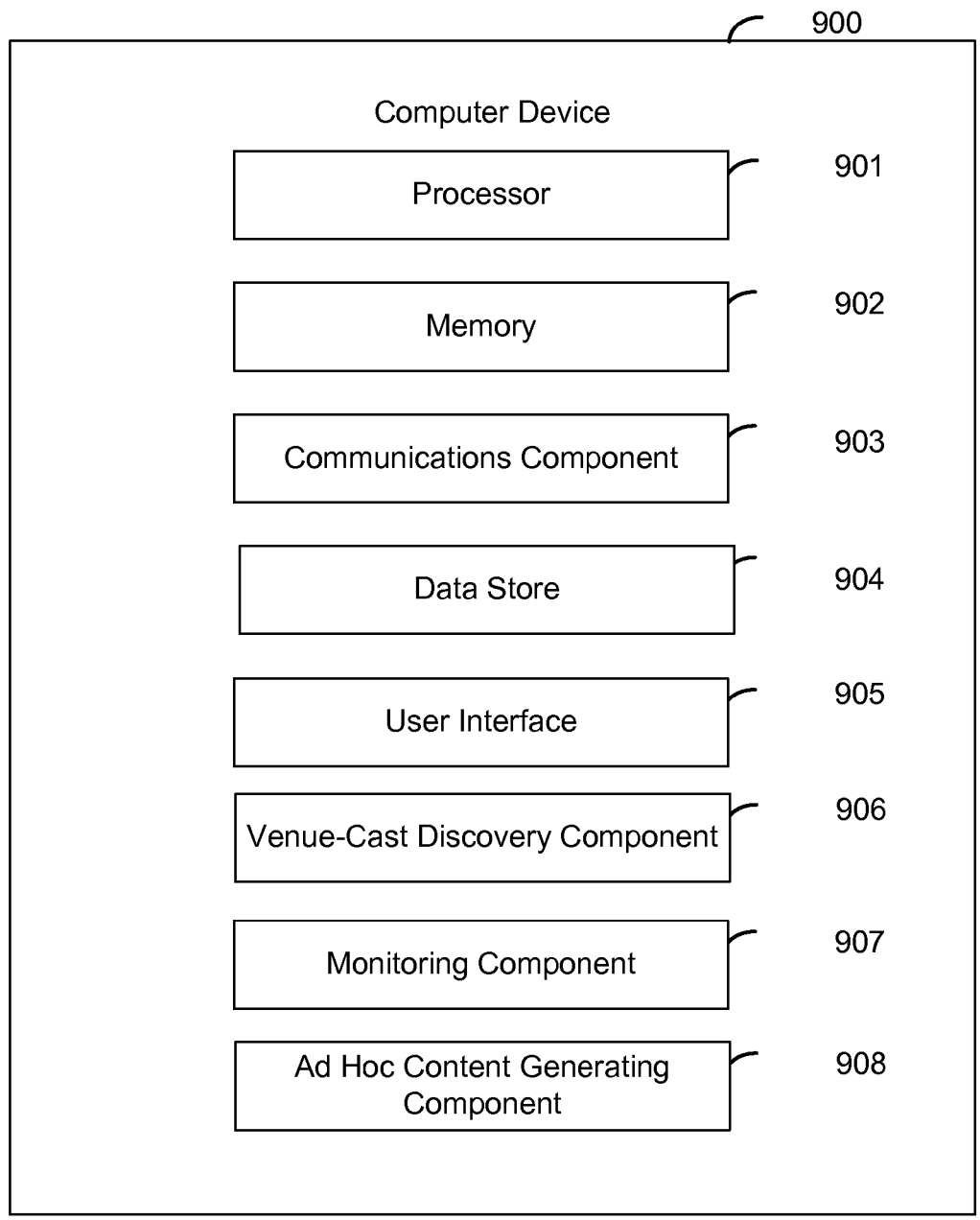
FIG. 9 illustrates a computer device for generating ad hoc venue-cast content and receiving venue-cast content.

Referring to FIG. 9, in one representative aspect, wireless communications device 900, herein referred to interchangeably as a mobile device, includes a mobile communication device operable on a wireless communication system. As can be appreciated, there are a variety of wireless communication systems, which often employ different spectrum bandwidths and/or different air interface technologies. Exemplary systems include CDMA (CDMA 2000, EV DO, WCDMA), OFDM, or OFDMA (Flash-OFDM, 802.20, WiMAX), FDMA/TDMA (GSM) systems using FDD or TDD licensed spectrums, peer-to-peer (e.g., mobile-to-mobile) ad hoc network systems often using unpaired unlicensed spectrums, and 802.xx wireless LAN or BLUETOOTH techniques.

Wireless communications device 900 includes processor component 901 for carrying out processing functions associated with one or more of components and functions described herein. Processor component 901 can include a single or multiple set of processors or multi-core processors. Moreover, processing component 901 can be implemented as an integrated processing system and/or a distributed processing system.

Wireless communications device 900 further includes a memory 902, such as for storing local versions of applications being executed by processor component 901. Memory 902 can include random access memory (RAM), read only memory (ROM), and a combination thereof.

Further, wireless communications device 900 includes a communications component 903 that provides for establishing and maintaining communications with one or more parties utilizing hardware, software, and services as described herein. Communications component 903 may carry communications between components on wireless communications device 900, as well as between wireless communications device 900 and external devices, such as devices located across a communications network and/or devices serially or locally connected to wireless communications device 900.

Additionally, wireless communications device 900 may further include a data store 904, which can be any suitable combination of hardware and/or software, that provides for mass storage of information, databases, and programs employed in connection with aspects described herein. For example, data store 904 may be a data repository for applications not currently executing.

Wireless communications device 900 may additionally include a user interface component 905 operable to receive inputs from a user of wireless communications device 900, and to generate outputs for presentation to the user. User interface component 905 may include one or more input devices, including but not limited to a keyboard, a number pad, a mouse, a touch-sensitive display, a navigation key, a function key, a microphone, a voice recognition component, any other mechanism capable of receiving an input from a user, or any combination thereof. Further, user interface component 905 may include one or more output devices, including but not limited to a display, a speaker, a haptic feedback mechanism, a printer, any other mechanism capable of presenting an output to a user, or any combination thereof.

Device 900 may further include a Venue-cast Discovery component 906 that detects the availability of a venue signal and/or a venue SG.

Device 900 may further include a monitoring component 907 that monitors for the notifications regarding the availability of ad hoc type venue-cast content. The monitoring component 907 may monitor for scheduled Service Guide (SG) updates and for unscheduled notifications regarding changes in the venue-cast content, such as the VIB notification discussed above. Changes may include additions of a channel of ad hoc type content or the termination of a previously supplied ad hoc type channel. The monitoring component may look for an index or version change in a Unicast Access Terminal Identifier (UATI) specific page or in a MATI type notification.

Device 900 may further include components for decoding a combined superframe signal. A portion of the superframe signal may be used for a wide area signal, a portion for a local area signal, and a portion for a venue signal. The signals may also be received as more than one signal, and decoded by the mobile device.

Device 900 may also include an ad hoc content generating component 908 for generating ad hoc content to be transmitted to the venue-cast network. This component may include a video and/or audio recorder for recording ad hoc content. The component may further include a user interface for receiving other data to be transmitted as ad hoc venue-cast content.

Figure 10:
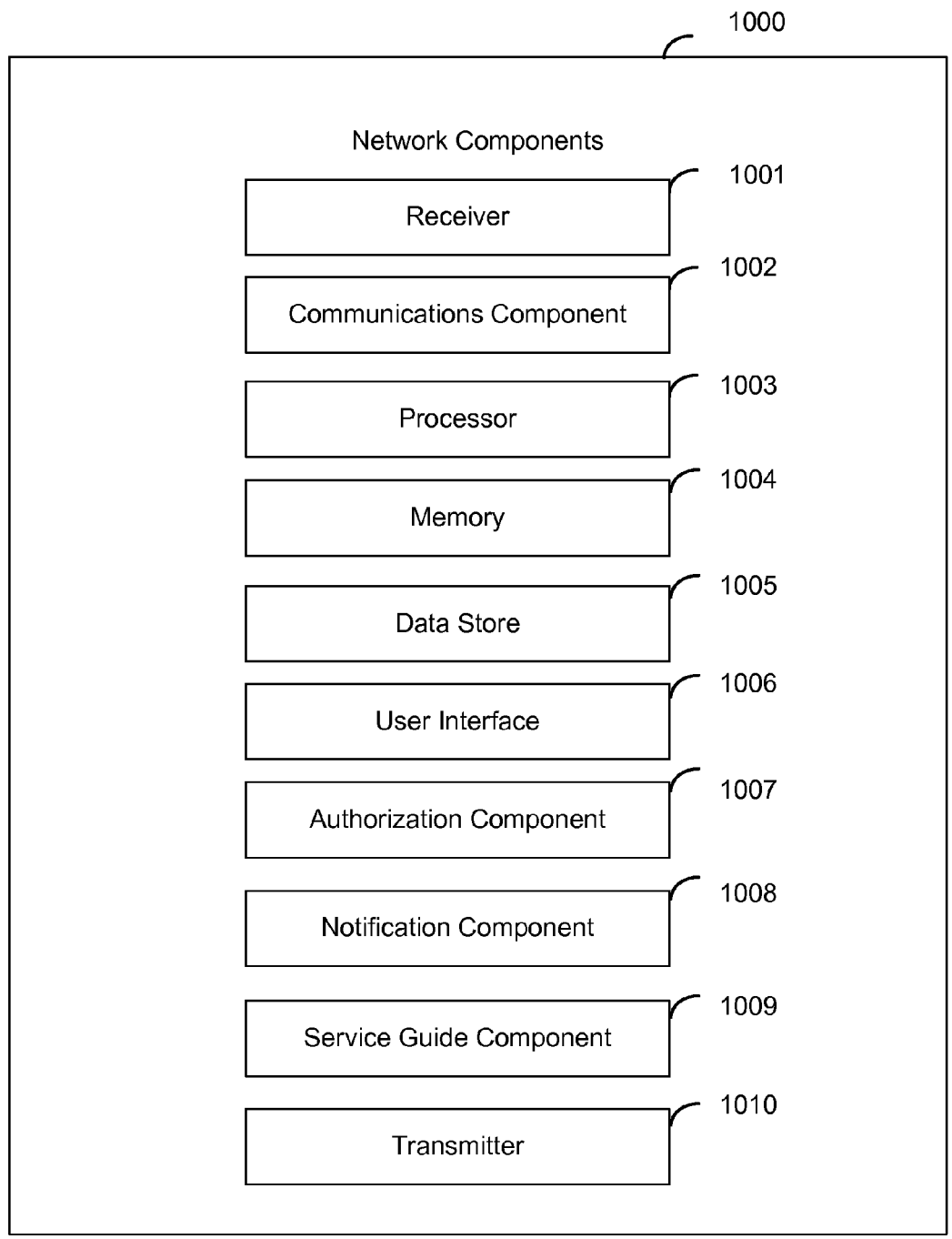
FIG. 10 illustrates network components for receiving and broadcasting ad hoc venue-cast content.

FIG. 10 illustrates exemplary ad hoc venue-cast network components. As can be appreciated, there are a variety of wireless communication systems, which often employ different spectrum bandwidths and/or different air interface technologies. Exemplary systems include CDMA (CDMA 2000, EV DO, WCDMA), OFDM, or OFDMA (Flash-OFDM, 802.20, WiMAX), FDMA/TDMA (GSM) systems using FDD or TDD licensed spectrums, peer-to-peer (e.g., mobile-to-mobile) ad hoc network systems often using unpaired unlicensed spectrums, and 802.xx wireless LAN or BLUETOOTH techniques.

The ad hoc venue-cast network 1000 may include a receiver 1001 for receiving ad hoc communication from a user authorized to submit ad hoc venue-cast content. As discussed in connection with FIGS. 2-4, the receiver 1001 may receive unicast transmissions from the ad hoc content initiator.

Further, ad hoc venue-cast network 1000 may include a communications component 1002 that provides for establishing and maintaining communications with one or more parties utilizing hardware, software, and services as described herein. Communications component 1002 may carry communications between components in ad hoc venue-cast network 1000, as well as between ad hoc venue-cast network 1000 and external devices, such as devices located across a communications network and/or devices serially or locally connected to a wireless communications device.

The ad hoc venue-cast network 1000 may include processor component 1003 for carrying out processing functions associated with one or more of components and functions described herein. Processor component 1003 can include a single or multiple set of processors or multi-core processors. Moreover, processing component 1003 can be implemented as an integrated processing system and/or a distributed processing system. For example, processor component 1003 may process ad hoc venue-cast content that is received from an access terminal and prepare it for venue-cast transmission.

Ad hoc venue-cast network 1000 may include further includes a memory 1004, such as for storing local versions of applications being executed by processor component 10032. Memory 1004 can include random access memory (RAM), read only memory (ROM), and a combination thereof.

Additionally, ad hoc venue-cast network 1000 may further include a data store 1005, which can be any suitable combination of hardware and/or software, that provides for mass storage of information, databases, and programs employed in connection with aspects described herein. For example, data store 1005 may be a data repository for applications not currently executing. The ad hoc content may be buffered in data store 1005 prior to venue-cast transmission of the content.

Ad hoc venue-cast network 1000 may additionally include a user interface component 1006 operable to receive inputs from a user managing aspects of ad hoc venue-cast network 1000, and to generate outputs for presentation to the user. User interface component 1006 may include one or more input devices, including but not limited to a keyboard, a number pad, a mouse, a touch-sensitive display, a navigation key, a function key, a microphone, a voice recognition component, any other mechanism capable of receiving an input from a user, or any combination thereof. Further, user interface component 1006 may include one or more output devices, including but not limited to a display, a speaker, a haptic feedback mechanism, a printer, any other mechanism capable of presenting an output to a user, or any combination thereof.

Ad hoc venue-cast network 1000 may additionally include an optional authorization component 1007 that verifies that an access terminal that submits ad hoc venue-cast content is authorized to generate ad hoc venue-cast content. The authorization component 1007 may also verify that the location of the access terminal submitting the ad hoc content is within a boundary of the venue. The authorization component 1007 may verify such authorizations prior to processing the ad hoc content. The authorization component may authorize an access terminal to generate ad hoc venue-cast content in advance of the receipt of such ad hoc content. The authorization component may also offer a subscription to the access terminal upon receiving the ad hoc content. The subscription would allow the access terminal to generate ad hoc venue-cast content. Upon receiving an acceptance of the subscription offer, the authorization component 1007 authorizes the access terminal to generate ad hoc venue-cast content.

Ad hoc venue-cast network 1000 may additionally include a notification component 1008 for notifying a plurality of access terminals within a venue of the availability of or termination of ad hoc venue-cast content. The notification component 1008 may transmit such notification between transmissions of a periodic service guide update. The notification component 1008 may deliver the notification via a control channel or using multicast (MATI) addressing.

Ad hoc venue-cast network 1000 may additionally include a service guide component 1009 that generates a service guide with venue-cast information. This component may add notification regarding the ad hoc venue-cast to a service guide generated for the scheduled venue-cast.

Ad hoc venue-cast network 1000 may additionally include a transmitter for transmitting the ad hoc content to receivers within the venue.

It should be apparent that the aspects herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than the one or more of the aspects set forth herein.

It is to be recognized that depending on the aspect, certain acts, or events of any of the methods described herein, can be performed in a different sequence, may be added, merged, or left out together (e.g., not all described acts or events are necessary for the practice of the method). Moreover, in certain aspects, acts or events may be performed concurrently, e.g., through multi-threaded processing, interrupt processing, or multiple processors, rather than sequentially.

As used in this application, the terms "component," "module," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

The techniques described herein may be used for various wireless communication systems such as CDMA, TDMA, FDMA, OFDMA, SC-FDMA and other systems. The terms "system" and "network" are often used interchangeably. A CDMA system may implement a radio technology such as Universal Terrestrial Radio Access (UTRA), cdma2000, etc. UTRA includes Wideband-CDMA (W-CDMA) and other variants of CDMA. Further, cdma2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM□, etc. UTRA and E-UTRA are part of Universal Mobile Telecommunication System (UMTS). 3GPP Long Term Evolution (LTE) is a release of UMTS that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). Additionally, cdma2000 and UMB are described in documents from an organization named "3rd Generation Partnership Project 2" (3GPP2). Further, such wireless communication systems may additionally include peer-to-peer (e.g., mobile-to-mobile) ad hoc network systems often using unpaired unlicensed spectrums, 802.xx wireless LAN, BLUETOOTH and any other short- or long-range, wireless communication techniques.

Various aspects or features are presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches may also be used.

The various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Additionally, at least one processor may comprise one or more modules operable to perform one or more of the steps and/or actions described above.

Further, the steps and/or actions of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to the processor, such that the processor can read information from, and write information to, the storage medium. In the alternative, the storage medium may be integral to the processor. Further, in some aspects, the processor and the storage medium may reside in an ASIC. Additionally, the ASIC may reside in a user terminal. In the alternative, the processor and the storage medium may reside as discrete components in a user terminal. Additionally, in some aspects, the steps and/or actions of a method or algorithm may reside as one or any combination or set of codes and/or instructions on a machine readable medium and/or computer readable medium, which may be incorporated into a computer program product.

In one or more aspects, the functions described may be implemented in hardware, software, firmware, or any combination thereof. If implemented in software, the functions may be stored or transmitted as one or more instructions or code on a computer-readable medium. Computer-readable media includes both computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection may be termed a computer-readable medium. For example, if software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs usually reproduce data optically with lasers. Combinations of the above should also be included within the scope of computer-readable media.

While the foregoing disclosure discusses illustrative aspects and/or aspects, it should be noted that various changes and modifications could be made herein without departing from the scope of the described aspects and/or aspects as defined by the appended claims. Furthermore, although elements of the described aspects and/or aspects may be described or claimed in the singular, the plural is contemplated unless limitation to the singular is explicitly stated. Additionally, all or a portion of any aspect and/or aspects may be utilized with all or a portion of any other aspect and/or aspect, unless stated otherwise.

What is claimed is:

1. A method for providing ad hoc venue-cast content to a plurality of receiving access terminals within a venue boundary, comprising:
   receiving, at a venue content server, the ad hoc content from a first access terminal within the venue whose location is verified to be within the venue;
   buffering and processing the ad hoc content prior to transmission such that the ad hoc content is linked to scheduled venue content;
   notifying the plurality of receiving access terminals within the venue of the availability of the ad hoc content;
   generating a service guide to provide information regarding venue-cast channel availability to broadcast the scheduled content along with the ad hoc content, wherein the service guide is transmitted separate from the notification regarding the availability of the ad hoc content; and
   transmitting the ad hoc content along with the scheduled venue content to the plurality of receivers within the venue, wherein the ad hoc content is generated at the first access terminal in an unscheduled manner such that a starting and ending time for the ad hoc content is unknown prior to receipt of the ad hoc content at the venue content server.

2. The method according to claim 1, further comprising:
   notifying the plurality of receiving access terminals within the venue of the termination of the transmission of the ad hoc content.

3. The method according to claim 2, wherein the notification of the termination is sent before a buffer for buffering the ad hoc content is empty.

4. The method according to claim 1, further comprising:
   verifying that the first access terminal is authorized to generate ad hoc venue-cast content prior to processing the ad hoc content.

5. The method according to claim 4, further comprising:
   verifying that the location of the first access terminal is within a boundary of the venue prior to processing the ad hoc content.

6. The method according to claim 1, further comprising:
   transmitting the scheduled venue content on a first channel; and
   transmitting the ad hoc content on a second channel.

7. The method according to claim 1, further comprising:
   providing the service guide for download via a website.

8. The method according to claim 1, further comprising:
   periodically transmitting the service guide to the plurality of receiving access terminals.

9. The method according to claim 8, wherein the notification of the availability of the ad hoc content is provided between the periodic transmissions of the service guide.

10. The method according to claim 9, wherein the notification is a venue information block delivered via a control channel.

11. The method according to claim 10, further comprising:
    delivering the venue information block using multicast (MATI) addressing.

12. The method according to claim 1, further comprising:
    terminating the transmission of the ad hoc content.

13. The method according to claim 12, wherein the termination is based on the termination of the received unicast ad hoc content.

14. The method according to claim 12, wherein the termination is based on a time limit determined at the venue content server.

15. The method according to claim 1, further comprising:
    receiving, at a venue content server, unscheduled unicast content from a second access terminal within the venue.

16. The method according to claim 15, further comprising:
    transmitting the ad hoc content from the first and the second access terminals on separate channels.

17. The method according to claim 15, further comprising:
    combining the ad hoc content from the first and the second access terminals; and
    transmitting the combined ad hoc content on a single channel.

18. The method according to claim 1, wherein the ad hoc content includes a live video feed.

19. The method according to claim 1, wherein the ad hoc content includes venue related information for a venue specific chatroom.

20. The method according to claim 19, further comprising:
    creating a venue specific chatroom; and
    transmitting the ad hoc content as at least one of text or data clips in the venue specific chatroom.

21. The method according to claim 1, further comprising:
    authorizing the access terminal to generate ad hoc venue content in advance of the receipt of the ad hoc content.

22. The method according to claim 1, further comprising:
transmitting an offer of a subscription to the access terminal upon receiving the ad hoc content;
receiving an acceptance of the subscription offer; and
authorizing the access terminal to generate ad hoc venue content based upon the subscription.

23. A computer program product, comprising:
a non-transitory computer readable medium comprising:
code for causing a computer to receive, at a venue content server, the ad hoc content from a first access Terminal within the venue whose location is verified to be within the venue;
code for causing a computer to buffer and process the ad hoc content prior to transmission such that the ad hoc content is linked to scheduled venue content;
code for causing a computer to notify a plurality of receiving access terminals within the venue of the availability of the ad hoc content;
code for generating a service guide to provide information regarding venue-cast channel availability to broadcast the scheduled content along with the ad hoc content, wherein the service guide is transmitted separate from the notification regarding the availability of the ad hoc content; and
code for causing a computer to transmit the ad hoc content along with the scheduled venue content to the plurality of receiving access terminals within the venue, wherein the ad hoc content is generated at the first access terminal in an unscheduled manner such that a starting and ending time for the ad hoc content is unknown prior to receipt of the ad hoc content at the venue content server.

24. The computer program product according to claim 23, wherein the non-transitory computer readable medium further comprises control logic for causing a computer to notify the plurality of receiving access terminals of a termination of the ad hoc content transmission.

25. An apparatus for providing ad hoc venue-cast content to a plurality of receiving access terminals within a venue boundary, the apparatus comprising:
means for receiving, at a venue content server, the ad hoc content from a first access terminal within the venue whose location is verified to be within the venue;
means for buffering and processing the ad hoc content prior to transmission such that the ad hoc content is linked to scheduled venue content;
means for notifying the plurality of receiving access terminals within the venue of the availability of the ad hoc content;
means for generating a service guide to provide information regarding venue-cast channel availability to broadcast the scheduled content along with the ad hoc content, wherein the service guide is transmitted separate from the notification regarding the availability of the ad hoc content; and
means for transmitting the ad hoc content along with the scheduled venue content to the plurality of receiving access terminals within the venue, wherein the ad hoc content is generated at the first access terminal in an unscheduled manner such that a starting and ending time for the ad hoc content is unknown prior to receipt of the ad hoc content at the venue content server.

26. The apparatus according to claim 25, further comprising:
means for notifying the plurality of receiving access terminals of a termination of the ad hoc content transmission.

27. A venue-cast system for providing ad hoc venue-cast content to a plurality of receiving access terminals within a venue boundary
a receiver for receiving, at a venue content server, the ad hoc content from a first access terminal within the venue whose location is verified to be within the venue;
a buffer and processor for buffering and processing the ad hoc content prior to transmission such that the ad hoc content is linked to scheduled venue content;
a service guide component for generating a service guide to provide information regarding venue-cast channel availability to broadcast the scheduled content along with the ad hoc content; and
a transmitter for notifying the plurality of receiving access terminals within the venue of the availability of the ad hoc content and for transmitting the ad hoc content along with the scheduled venue content to the plurality of receiving access terminals within the venue, wherein the ad hoc content is generated at the first access terminal in an unscheduled manner such that a starting and ending time for the ad hoc content is unknown prior to receipt of the ad hoc content at the venue content server, wherein the notification regarding the availability of the ad hoc content is transmitted separate from the service guide.

28. The venue-cast system according to claim 27, wherein the transmitter is further configured to notify the plurality of receiving access terminals within the venue of the termination of the transmission of the ad hoc content.

29. The venue-cast system according to claim 28, wherein the notification of the termination is sent before the buffer is empty.

30. The venue-cast system according to claim 27, wherein the processor is further configured to verify that the first access terminal is authorized to generate venue-cast content prior to processing the ad hoc content.

31. The venue-cast system according to claim 30, wherein the processor is further configured to verify that the location of the first access terminal is within a boundary of the venue prior to processing the ad hoc content.

32. The venue-cast system according to claim 27, wherein the scheduled venue content is transmitted on a first channel, and the ad hoc content is transmitted on a second channel.

33. The venue-cast system according to claim 27, further comprising:
a user interface for providing the service guide for download via a website.

34. The venue-cast system according to claim 27, wherein the service guide is periodically transmitted to the plurality of receivers.

35. The venue-cast system according to claim 34, wherein the notification of the availability of the ad hoc content is provided between the periodic transmissions of the service guide.

36. The venue-cast system according to claim 35, wherein the notification is a venue information block delivered via a control channel.

37. The venue-cast system according to claim 36, wherein the venue information block is delivered using multicast access terminal identifier addressing.

38. The venue-cast system according to claim 27, wherein the receiver at the venue content server is configured to receive unscheduled unicast content from a first and a second access terminal within the venue.

39. The venue-cast system according to claim 38, wherein the transmitter for transmitting the ad hoc content is configured to transmit the ad hoc content from the first and the second access terminal on a first and a second channel, respectively.

40. The venue-cast system according to claim 38, wherein the processor is further configured to combine the ad hoc content from the first and the second access terminal, wherein the transmitter is configured to transmit the combined ad hoc content on a single channel.

41. The venue-cast system according to claim 27, wherein the ad hoc content includes a live video feed.

42. The venue-cast system according to claim 27, wherein the ad hoc content includes venue related information for a venue specific chatroom.

43. The venue-cast system according to claim 42, further comprising:
a venue specific chatroom; wherein the ad hoc content is transmitted as at least one of text and data clips for the venue specific chatroom.

44. A mobile device for receiving ad hoc venue-cast content, the mobile device comprising:
a receiver for receiving the ad hoc venue-cast content along with scheduled venue-cast content, wherein the ad hoc venue-cast content and the scheduled venue-cast content are generated separately, wherein the ad hoc venue-cast content is generated in an unscheduled manner such that a starting and ending time for the ad hoc venue-cast content is unknown prior to a notification being received at the receiver regarding the availability of ad hoc venue-cast content, wherein the ad hoc venue-cast content is generated by at least one mobile device whose location is verified to be within a venue;
a venue-cast discovery component for detecting a venue-cast service guide which advertises the availability of a venue-cast channel carrying at least a portion of the scheduled venue-cast content and a portion of the ad hoc content, wherein the venue-cast discovery component is configured to autonomously trigger detection of the venue-cast service guide upon entering a designated location;
a processor for processing the venue-cast service guide;
a monitor for monitoring for the notification regarding the availability of ad hoc venue-cast content, wherein the notification is received separate from the service guide; and
a display for indicating the availability of ad hoc venue-cast content.

45. The mobile device of claim 44, further comprising:
a communications component for selecting one of a plurality of venue-cast channels.

46. The mobile device of claim 44, further comprising:
a user interface for selecting the reception of ad hoc venue-cast content.

47. The mobile device of claim 44, further comprising:
a user interface for downloading the service guide via a website.

48. The mobile device of claim 44, further comprising:
an ad hoc content generating component for generating ad hoc venue-cast content; and
a transmitter for transmitting ad hoc venue-cast content via unicast to a venue-cast network.

49. The mobile device of claim 48, further comprising:
a user interface for subscribing with the venue-cast network to receive authorization to transmit ad hoc venue-cast content.

50. A method of receiving ad hoc venue-cast content at a mobile device comprising:
receiving the ad hoc venue-cast content along with scheduled venue-cast content, wherein the ad hoc venue-cast content and the scheduled venue-cast content are generated separately, wherein the ad hoc venue-cast content is generated in an unscheduled manner such that a starting and ending time for the ad hoc venue-cast content is unknown prior to a notification being received at a receiver regarding the availability of ad hoc venue-cast content, wherein the ad hoc venue-cast content is generated by at least one mobile device whose location is verified to be within a venue;
autonomously triggering detection of a venue-cast service guide upon entering a designated location;
detecting the venue-cast service guide which advertises the availability of a venue-cast channel carrying at least a portion of the scheduled venue-cast content and a portion of the ad hoc content;
processing the venue-cast service guide;
monitoring for the notification regarding the availability of ad hoc venue-cast content, wherein the notification is received separate from the service guide; and
indicating the availability of ad hoc venue-cast content.

51. The method of claim 50, further comprising:
selecting one of a plurality of venue-cast channels.

52. The method of claim 50, further comprising:
selecting the reception of ad hoc venue-cast content.

53. The method of claim 50, further comprising:
downloading the service guide via a website.

54. The method of claim 50, further comprising:
generating ad hoc venue-cast content; and
transmitting ad hoc venue-cast content via unicast to a venue-cast network.

55. The method of claim 54, further comprising:
subscribing with the venue-cast network to receive authorization to transmit ad hoc venue-cast content.

56. A mobile device for receiving ad hoc venue-cast content, the mobile device comprising:
means for receiving the ad hoc venue-cast content along with scheduled venue-cast content, wherein the ad hoc venue-cast content and the scheduled venue-cast content are generated separately, wherein the ad hoc venue-cast content is generated in an unscheduled manner such that a starting and ending time for the ad hoc venue-cast content is unknown prior to a notification being received at the means for receiving regarding the availability of ad hoc venue-cast content, wherein the ad hoc venue-cast content is generated by at least one mobile device whose location is verified to be within a venue;
means for autonomously triggering detection of a venue-cast service guide upon entering a designated location;
means for detecting the venue-cast service guide which advertises the availability of a venue-cast channel carrying at least a portion of the scheduled venue-cast content and a portion of the ad hoc content;
means for processing a venue-cast service guide;
means for monitoring for the notification regarding the availability of ad hoc venue-cast content, wherein the notification is received separate from the service guide; and
means for indicating the availability of ad hoc venue-cast content.

57. A computer program product, comprising:
a non-transitory computer readable medium comprising:
code for causing a computer to receive the ad hoc venue-cast content along with scheduled venue-cast content, wherein the ad hoc venue-cast content and the scheduled venue-cast content are generated separately, wherein the ad hoc venue-cast content is generated in an unscheduled manner such that a starting and ending time for the ad hoc venue-cast content is unknown prior to a notification being received at a receiver regarding the availability of ad hoc venue-cast content, wherein the ad hoc venue-cast content is generated by at least one mobile device whose location is verified to be within a venue;

code for causing a computer to autonomously trigger detection of a venue-cast service guide upon entering a designated location;

code for causing a computer to detect the venue-cast service guide which advertises the availability of a venue-cast channel carrying at least a portion of the scheduled venue-cast content and a portion of the ad hoc content;

code for causing a computer to process a venue-cast service guide;

code for causing a computer to monitor for the notification regarding the availability of ad hoc venue-cast content, wherein the notification is received separate from the service guide; and code for causing a computer to indicate the availability of ad hoc venue-cast content.

* * * * *